(12) United States Patent
Kanter et al.

(10) Patent No.: US 9,152,990 B1
(45) Date of Patent: Oct. 6, 2015

(54) CROWDSOURCED PERSONALIZED COMPARISON TOOL

(75) Inventors: Max L. Kanter, Redmond, WA (US); Adam C. Sanders, Seattle, WA (US); Laxmikant A. Agrawal, Seattle, WA (US); David Erdmann, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 539 days.

(21) Appl. No.: 13/494,113

(22) Filed: Jun. 12, 2012

(51) Int. Cl.
*G06Q 30/00* (2012.01)
*G06Q 30/06* (2012.01)

(52) U.S. Cl.
CPC ........ *G06Q 30/0609* (2013.01); *G06Q 30/0641* (2013.01)

(58) Field of Classification Search
CPC ........... G06Q 30/0601–30/0645; G06Q 30/08; G06Q 10/0395; G06Q 30/282
USPC ................ 705/7.41, 26.1–27.2, 347
See application file for complete search history.

(56) References Cited

U.S. PATENT DOCUMENTS

| | | | | |
|---|---|---|---|---|
| 7,752,077 B2 * | 7/2010 | Holden et al. | | 705/26.1 |
| 7,881,974 B1 * | 2/2011 | Thirumalai et al. | | 705/26.1 |
| 2004/0019536 A1 * | 1/2004 | Ashkenazi et al. | | 705/27 |
| 2006/0265260 A1 * | 11/2006 | Brown et al. | | 705/7 |
| 2007/0226077 A1 * | 9/2007 | Frank et al. | | 705/27 |
| 2008/0046216 A1 * | 2/2008 | Thomas | | 702/179 |
| 2011/0173095 A1 * | 7/2011 | Kassaei et al. | | 705/26.41 |
| 2012/0158668 A1 * | 6/2012 | Tu et al. | | 707/687 |
| 2012/0284090 A1 * | 11/2012 | Marins et al. | | 705/7.39 |

OTHER PUBLICATIONS

Dodson, S. (Oct. 30, 2008). Technology: Enterprise: The customer knows best: More and more companies are using 'crowdsourcing' to exploit the wisdom of their customers by getting suggestions for product improvements, reports sean dodson. The Guardian Retrieved from http://search.proquest.com/professional/docview/244297137?accountid=161862.*
Foley, S. (Oct. 30, 2010). Fairness catches on as US consumer regulator goes for the simple approach. The Independent Retrieved from http://search.proquest.com/docview/761145696?accountid=14753.*

* cited by examiner

*Primary Examiner* — Resha Desai
*Assistant Examiner* — Katherine Huckfeldt
(74) *Attorney, Agent, or Firm* — Thomas | Horstemeyer, LLP

(57) ABSTRACT

Disclosed are various embodiments for providing a product comparison application utilizing crowdsourcing. A network page is rendered providing a grid comprising a plurality of products, product attributes, and/or attribute data. Additions and/or modifications of attributes, products, and/or attribute data are assigned a score to determine which addition or modification to display and/or associate with a product catalog. The grid provides a view for comparison of products.

21 Claims, 12 Drawing Sheets

FIG. 2B

CROWDSOURCED PERSONALIZED COMPARISON TOOL

BACKGROUND

An electronic marketplace may be presented through a network site where a multitude of different sellers offer products for sale. Unfortunately, it can be common for data pertaining to the attributes of a product to be missing, incomplete, or inaccurate. This can hamper the online shopping experience.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A-F are drawings of examples of user interfaces rendered by a client in the networked environment of FIG. 1 according to various embodiments of the present disclosure.

DETAILED DESCRIPTION

The present disclosure relates to providing crowdsourced data associated with attributes of a product in a product comparison tool. A customer of an electronic marketplace may have a product in mind that the customer desires to purchase. As a non-limiting example, a customer may be in the marketplace for 42" televisions with a budget of $500. The customer may want to put together a grid or spreadsheet comparing and contrasting all of the attributes of several products. For example, this grid may be used by the customer to quickly compare and contrast the price, resolution, and size of televisions that fit the customer's budget. Because a particular attribute may be the basis of the customer's decision in selecting one product over another, it is important for the attribute data to be accurate. Therefore, according to various embodiments, a product comparison application is described that facilitates crowdsourcing to ensure accuracy of the attribute data associated with products. Further, the customer may want to share the grid he or she has created with friends and/or other customers. In the following discussion, a general description of the system and its components is provided, followed by a discussion of the operation of the same.

Figure 1:
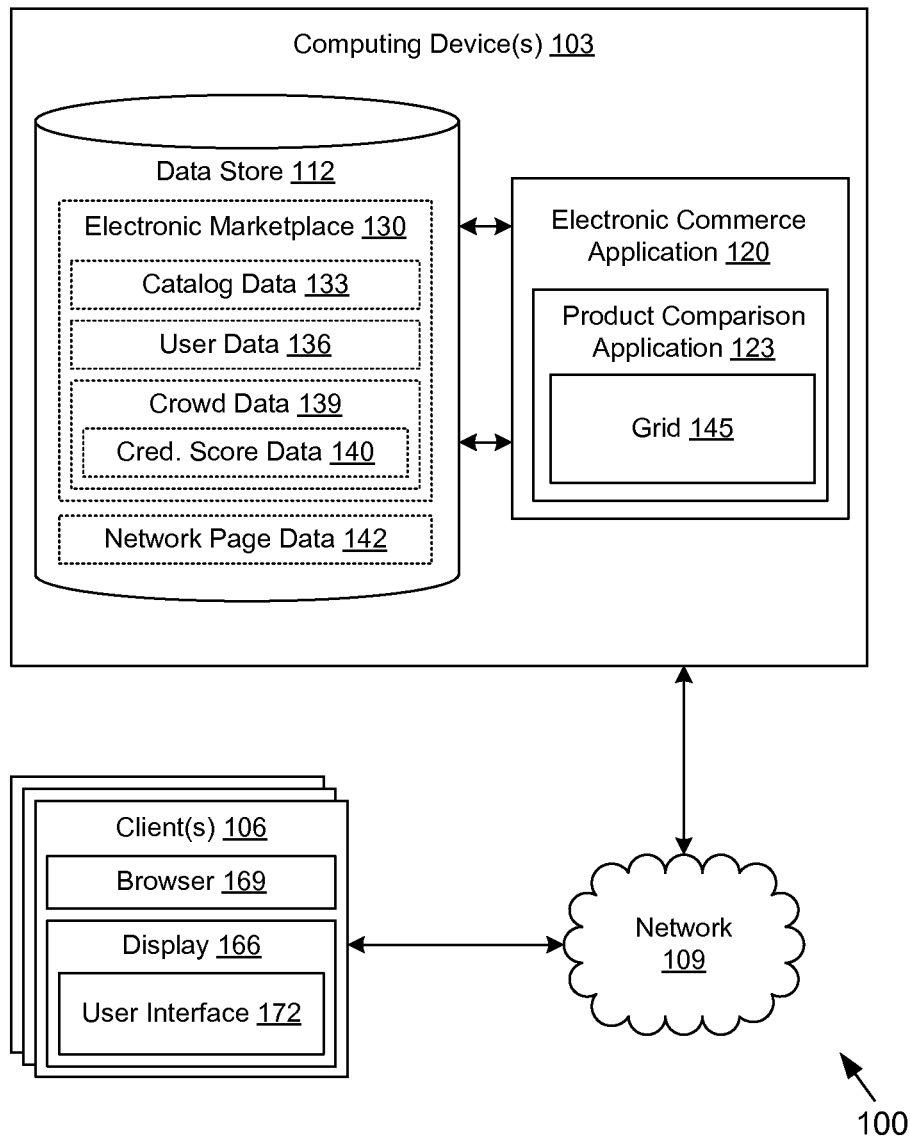
FIG. 1 is a drawing of a networked environment according to various embodiments of the present disclosure.

With reference to FIG. 1, shown is a networked environment 100 according to various embodiments. The networked environment 100 includes one or more computing device(s) 103 in data communication with one or more client(s) 106 by a way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112 for example, is associated with the operation of the various applications and/or functional entities described below.

The components executed on the computing device 103, for example, includes an electronic commerce application 120 and other applications, services, processes, systems, engines, or functionality not discussed in detail herein. The electronic commerce application 120 is executed in order to facilitate the online purchase of items from one or more electronic marketplaces over network 109. The electronic commerce application 120 also performs various backend functions associated with the online presence of an electronic marketplace in order to facilitate the online purchase of items as will be described. For example, the electronic commerce application 120 renders user interfaces 172 such as, for example, web pages and/or other types of network content that are provided to clients 106 for the purposes of promoting and selecting items for purchase, rental, download, lease, or any other forms of consumption.

The electronic commerce application 120 may include, for example, a product comparison application 123 and/or other components. The product comparison application 123 is executed in order to provide a grid 145 interface for electronic marketplace customers to manage a product comparison of products on one or more electronic marketplaces. For example, the product comparison application 123 may generate one or more grid 145 areas on a user interface 172 that permits customers to select products to add to the comparison; select attributes pertaining to products; create, edit, or delete custom data and/or attributes; share the grid 145; and/or any other tools that may assist in the comparison of products.

Further, the product comparison application 123 is executed to obtain accurate data pertaining to products available in the electronic marketplace. An electronic marketplace 130 may have catalog data 133 pertaining to certain products. It is possible that catalog data 133 may be inaccurate, obsolete, or incomplete. Product comparison application 123 may determine whether catalog data 133 is accurate and/or incomplete. Catalog data 133 may be obtained and/or verified from the crowd via crowdsourcing. For example, catalog data 133 may be extracted from one or more grids 145 created and/or modified by other users. At times, conflicting catalog data 133 may exist. A score may be given to the catalog data. Depending on the score of the data, the product comparison application 123 may determine which data to present to a customer. For example, if the weight of a television is provided by 100,000 users as 24.98 pounds, this attribute data may be given a higher score than a weight of the same television submitted by 15 users as 25 pounds. If the number of occurrences of the television weight as 25 pounds increases to surpass the occurrence threshold of 24.98 pounds, the product comparison application 123 may make the determination that a higher score is to be assigned to the former. Alternatively, the data may have been obtained from a very reliable source (e.g., the manufacturer of the product). The product comparison application 123 may give certain data a higher score while determining which data to display to a user. Additionally, the product comparison application 123 may be configured to determine whether a sales price for a product is competitively priced in certain electronic marketplaces (e.g., priced too low or too high relative to other marketplaces) and explain its determination to the customer.

The data stored in the data store 112 includes, for example, data relating to one or more electronic marketplaces 130, network page data 142, merchant data, and potentially other data. Each electronic marketplace 130 may be associated with various data such as, for example, catalog data 133, user data 136, and/or other data.

The catalog data 133 may include information related to a plurality of items offered in the electronic marketplace. An item may refer to a product, good, service, software download, multimedia download, social networking profile, or any combination, bundle, or package thereof, that may be offered for sale, purchase, rental, lease, download, and/or any other form of consumption as can be appreciated. The various product attributes stored in catalog data 133 may include, for example, titles, descriptions, quantities, conditions, images, options, weights, customer reviews, customer ratings, keywords, shipping restrictions, prices, tax classifications, unique identifiers, and any other data related to the items.

The user data 136 may include information related to a plurality of users (e.g., customers) of electronic marketplace 130. User data 136 may refer to user navigation history, cookies, products viewed by the user, products purchased by the user, saved product comparison grids 145, uploaded grids 145, uploaded images, modifications to other product comparison grids 145, social networking data, e-mail address, contact information, demographic data, and/or other data.

The crowd data 139 may include data provided by or determined from a plurality of users of an electronic marketplace 130. Crowd data 139 may refer to product data, product feature data, uploaded images, modifications to product comparison grids 145, credibility score data 140, demographic data, social networking data, and/or other data. Credibility score data 140 may include, for example, a generated score to determine whether the data and/or creator of the data are a reliable source of information. For example, if a user consistently provides data that is correct after verification, the data provided by the user may be assigned with a higher credibility score than users who consistently provide inaccurate data.

The network page data 142 includes data that may be used in the rendering of a user interface 172. Such data may include templates, code, images, audio, video, hypertext markup language (HTML), extensible markup language (XML), JavaScript, cascading style sheets (CSS), and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 166. The display 166 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 169 and/or other applications. The browser 169 may be executed in a client 106, for example, to access and render network pages, such as web pages, or other network content served up by the computing device 103 and/or other servers. The client 106 may be configured to execute applications beyond browser 169 such as, for example, email applications, instant message applications, and/or other applications.

Next, a general description of the operation of the various components of the networked environment 100 is provided. To begin, a user may create or access a previously created product comparison via product comparison application 123 in an electronic commerce application 120. To this end, the product comparison application 123 may generate a series of user interfaces 172 to add products and attributes to a table or grid that resembles a grid 145. User interface 172 is sent over the network 109 for rendering by a browser 169 in a client 106 operated by the user. Alternatively, the user interface 172 may be rendered on a client 106 by a dedicated application.

The product comparison application 123 may access data store 112 to provide an abundance of data associated with attributes of the products. The product comparison application 123 may also store data provided by the user in data store 112.

Figure 2A:
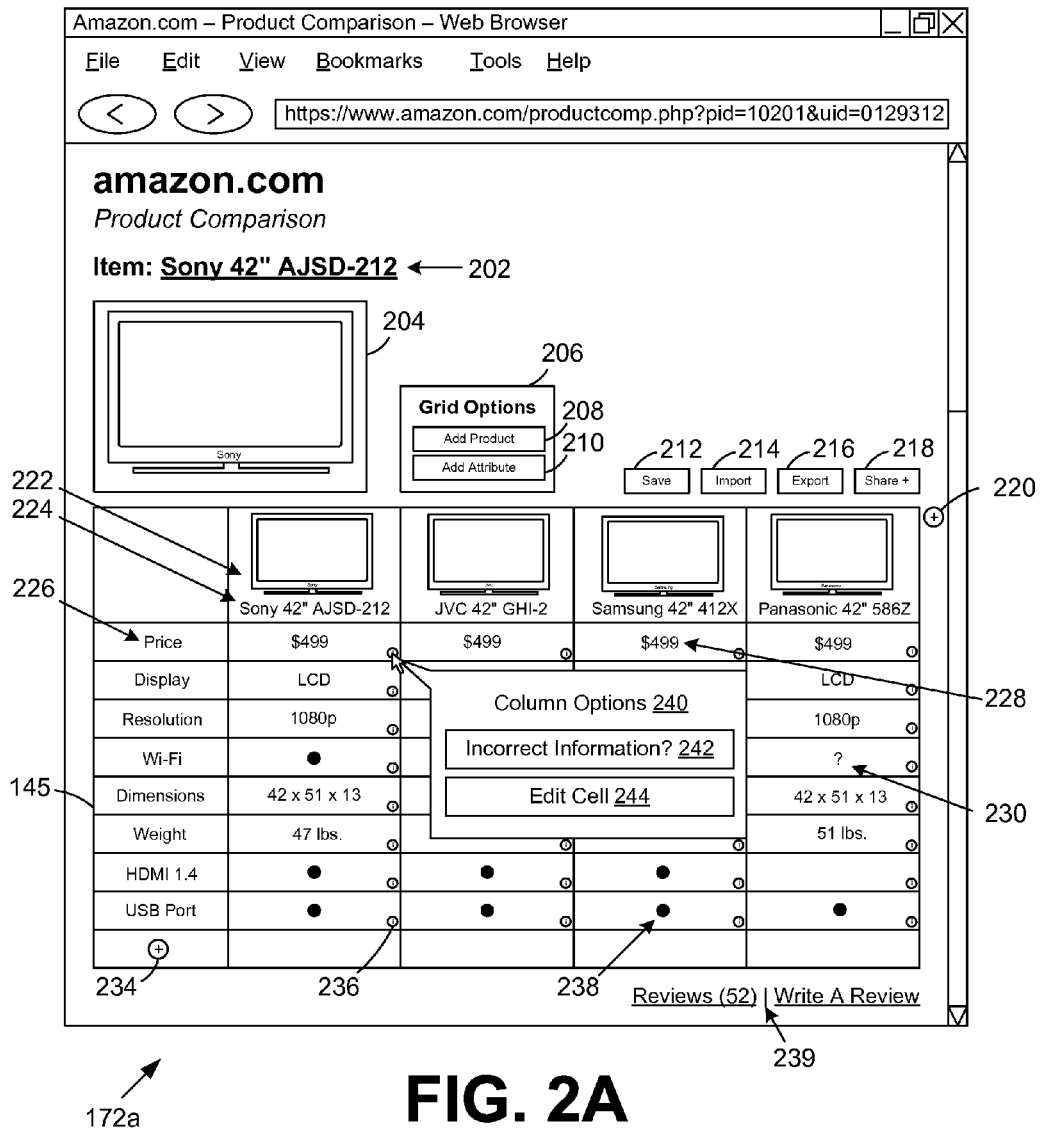

Referring next to FIG. 2A, shown is an example of a user interface 172 (FIG. 1), denoted herein as user interface 172*a*, in the browser 169 (FIG. 1) executed in the client 106 (FIG. 1) in the networked environment 100 (FIG. 1) according to various embodiments. Specifically, user interface 172*a* depicts a network page that corresponds to a product comparison grid generated by product comparison application 123 (FIG. 1). In this non-limiting example, an item name 202 and item image 204 indicate that the item for which pricing is being compared is the "Sony 42" AJSD-212." Alternatively, the user interface 172*a* may be rendered on a client 106 by a dedicated application.

The grid 145 contains four products with each product having its own column. In this example, rows 226 display attributes associated with the product. The attributes of a television product in this example may include price, display, resolution, Wi-Fi capability, dimensions, weight, HDMI and USB ports, and any other feature associated with the product.

Data entries 228 are provided as contents of the cell corresponding to both a row of an attribute and a column of a product. If a data entry for a column is unknown and/or cannot be determined, a picture, icon, or symbol may be displayed to explain the absence of data. In this example, symbol 230 is shown as a question mark. Additionally, whether a product has a certain attribute may be represented by a picture, icon, or symbol. For example, icon 238 indicates that the Samsung 42" 412X television has a USB port.

Image 222 is an image corresponding to the product and may be provided by catalog data 133 (FIG. 1) and/or provided by the user. Product name 224 represents the name of the product in the specific column. When icon 220 is engaged by a user, it may initiate the addition of more products to the product comparison application 123. Similarly, when icon 234 is engaged by a user, it may initiate the addition of more attributes to grid 145. Additionally, grid options 206 may initiate the addition of products via button 208 or attributes via button 210.

The product comparison application 123 may permit a user to save the current state of the grid 145, for example, on a server via save button 212. In a different embodiment, save button 212 may permit a user to save the grid 145 to a local disk. If a user has created a product comparison in another application, import button 214 may initiate the import of a grid 145 into the product comparison application 123. Additionally, a user may desire to export the grid 145 to other applications and/or databases. Thus, a user may initiate the export the current state of the grid 145 via export button 216. For example, a generated file may be exported as a comma-separated value document. Button 218 permits a user to initiate the sharing of grid 145.

As a non-limiting example, the user interface 172*a* provides an icon 236 in a cell of the grid 145. When icon 236 is engaged by a user, a column options dialog box 240 may prompt the user with various options. For example, button 242 is one method of crowdsourcing the data in the cell. Specifically, it is a way for a user to identify incorrect information in product comparison application 123. This may be later used in determining whether the user is a credible source of information and whether the attribute data in the column is actually correct.

A feature of the product comparison application 123 may include the ability to read and/or write comparative reviews associated with the grid 145. For example, hyperlinks 239 may initiate the rendering of subsequent pages associated with reviews of the grid 145. A user may engage hyperlinks 239 to write a review and/or read one or more previously created reviews. Reviews may be further utilized by providing additional hyperlinks to one or more reviews in an information page associated with a product featured in a product comparison.

Edit cell button 244 is another method of crowdsourcing the data in the cell. Specifically, button 244 permits a user to edit the contents of the cell. If a user selects this option, the user may enter custom attribute data in the contents of the cell. The new attribute data may be used in further determining accurate attributes pertaining to the product.

Figure 2B:
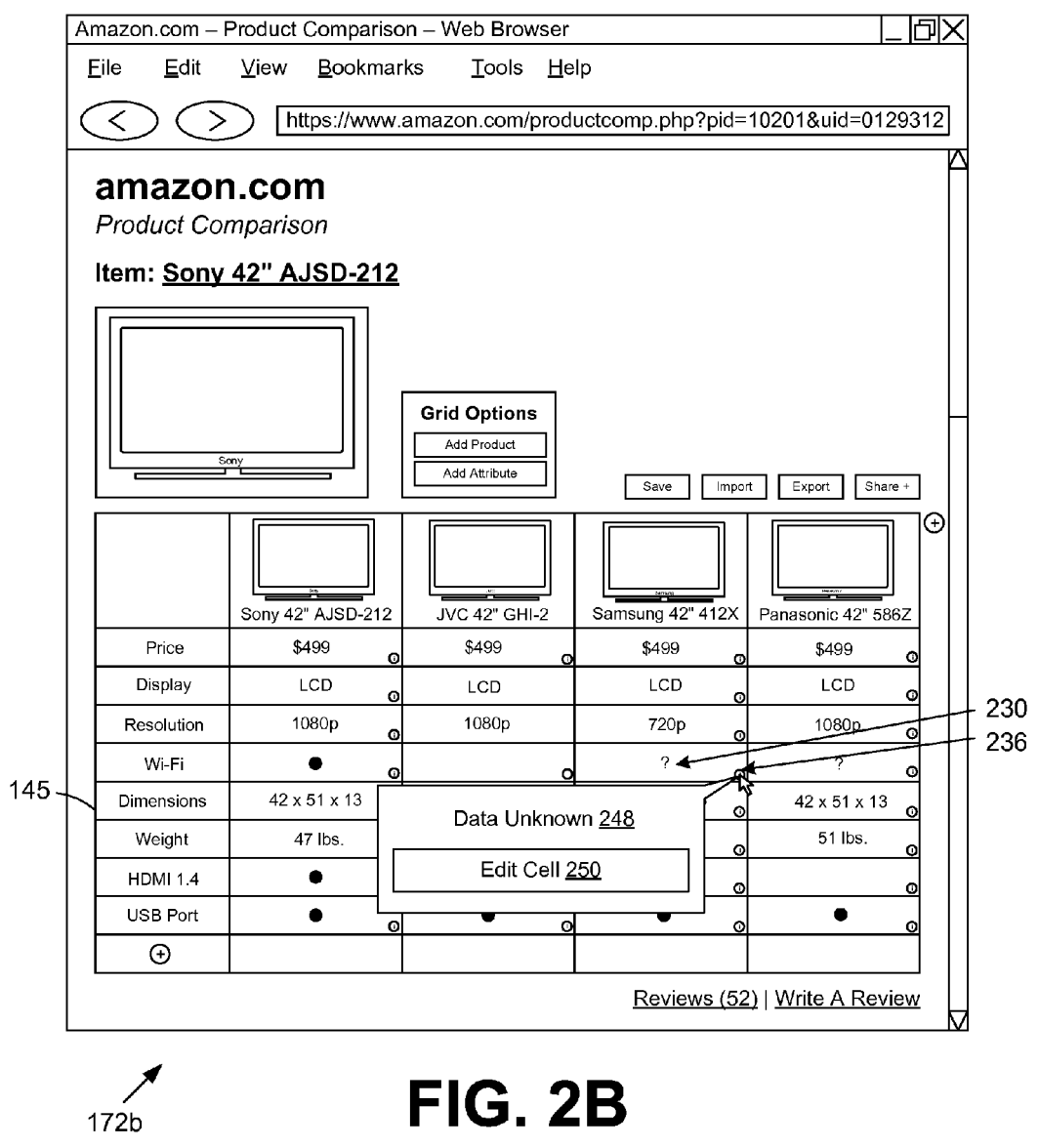

Referring next to FIG. 2B, shown is an example of a user interface 172 (FIG. 1), denoted herein as user interface 172*b*, in the browser 169 (FIG. 1) executed in the client 106 (FIG. 1) in the networked environment 100 (FIG. 1) according to various embodiments. Specifically, user interface 172 depicts a network page that corresponds to a product comparison grid 145 generated by product comparison application 123 (FIG. 1). Alternatively, the user interface 172*b* may be rendered on a client 106 by a dedicated application.

In this non-limiting example, symbol 230 indicates that the attribute data of the cell associated with the product is unknown. If the attribute data of a cell is unknown, a data unknown dialog box 248 may be displayed when icon 236 associated with the cell is engaged by the user.

As discussed above with respect to button 244 (FIG. 2A), button 250 similarly permits a user to edit the cell of the column. If a user selects this option, the user may enter custom data in the contents of the cell. The new cell contents may be used in further determining accurate attribute data pertaining to the product and/or determining credibility score data 140 (FIG. 1).

Figure 2C:
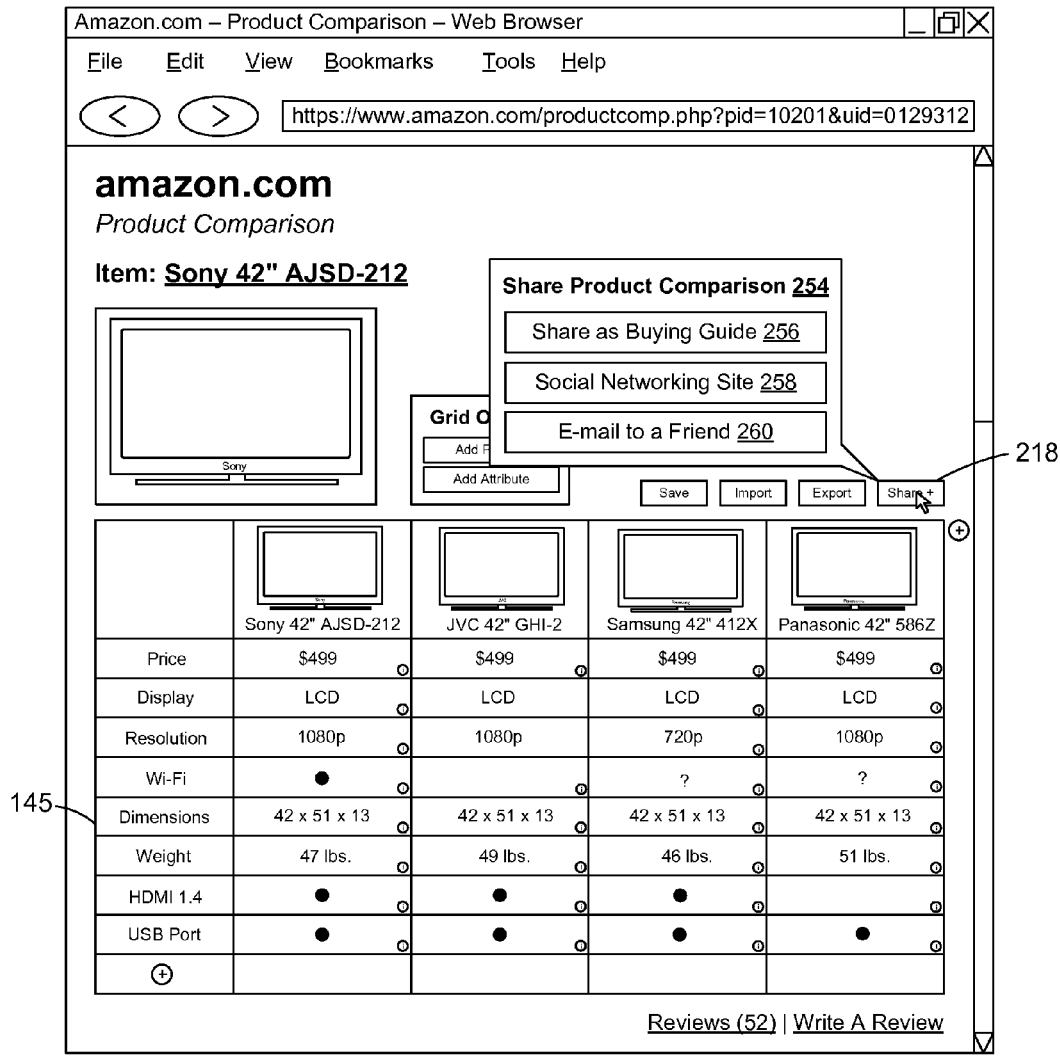

Turning now to FIG. 2C, shown is an example of a user interface 172 (FIG. 1), denoted herein as user interface 172*c*, in the browser 169 (FIG. 1) executed in the client 106 (FIG. 1) in the networked environment 100 (FIG. 1) according to various embodiments. Specifically, the rendered user interface 172*c* depicts a network page or other network content rendered by a dedicated application that corresponds to a product comparison grid 145 generated by product comparison application 123 (FIG. 1). Alternatively, the user interface 172*c* may be rendered on a client 106 by a dedicated application.

In this non-limiting example, the product comparison application 123 facilitates the sharing of the grid 145 over network 109 (FIG. 1). When a user engages share button 218, a dialog 254 may appear prompting a user with various methods of sharing the grid 145. For example, the user may share the grid 145 as a "buying guide" via button 256. Accordingly, an electronic marketplace 130 (FIG. 1) may advertise the grid 145 as a "buying guide," which may be useful to other customers in making a purchase. For example, a user viewing an information page pertaining to a Sony 42" AJSD-212 television may find a product comparison grid 145 useful in determining whether to purchase the item. The information page for the television may provide the user with a hyperlink that directs the user to product comparison application 123 which may generate the grid 145 shared as a buying guide. The grid 145 may also be shared among social networking sites via button 258 or through e-mail via button 260.

Figure 2D:
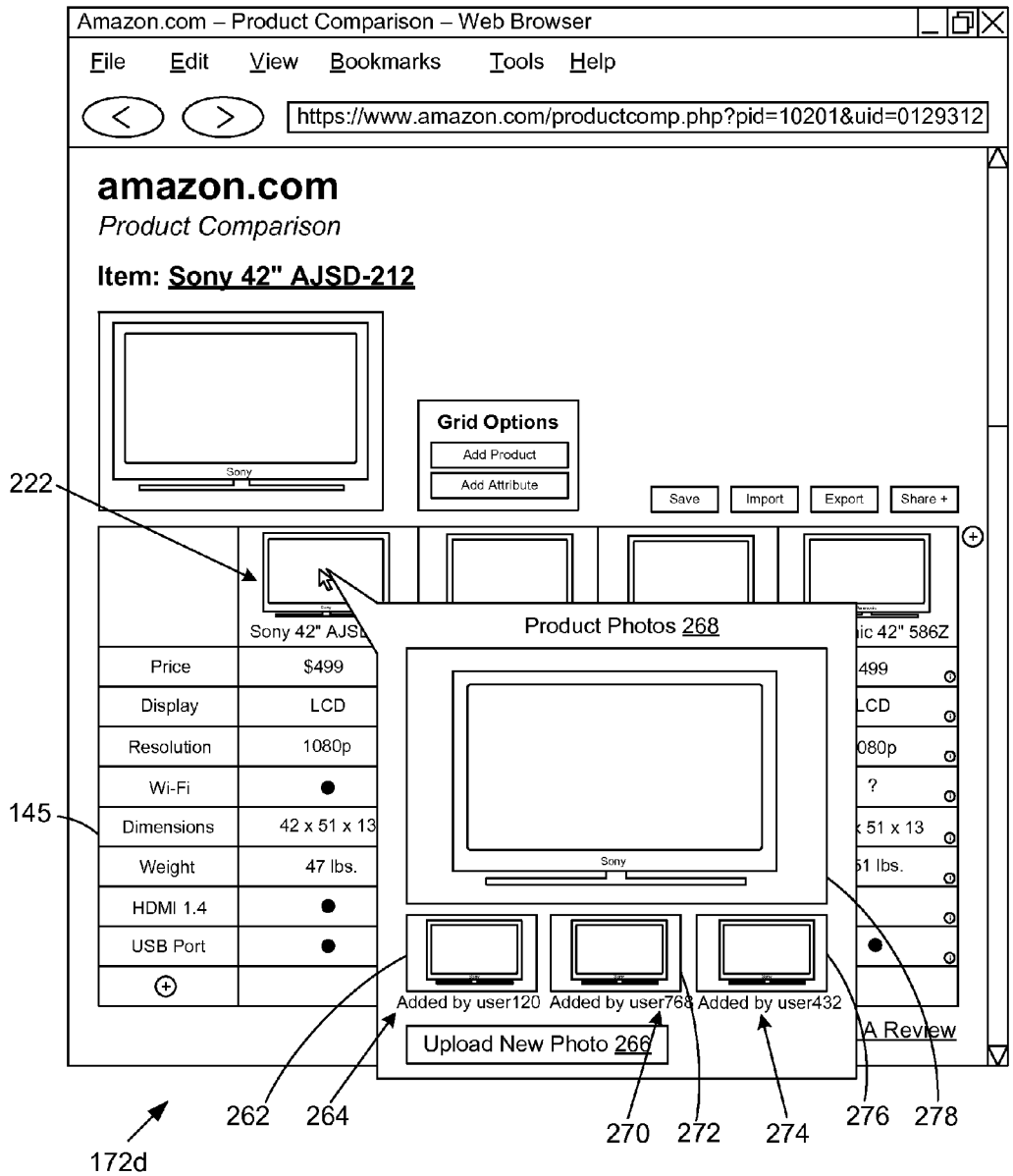

Turning now to FIG. 2D, shown is an example of a user interface 172 (FIG. 1), denoted herein as user interface 172*d*, in the browser 169 (FIG. 1) executed in the client 106 (FIG. 1) in the networked environment 100 (FIG. 1) according to various embodiments. Specifically, the rendered user interface 172 depicts a network page that corresponds to a product comparison grid 145 generated by product comparison application 123 (FIG. 1). Alternatively, the user interface 172*d* may be rendered on a client 106 by a dedicated application.

In this non-limiting example, the product comparison application 123 facilitates the offering of a plurality of product images. When a user engages a product image, a product photos dialog 268 may display a plurality of manufacturer and/or crowdsourced images associated with a product. Crowdsourced images may be images 262, 272, 276, and 278, for example, provided by a plurality of users from the crowd such as users 264, 270, and 274. The crowdsourced images may be flagged and/or filtered by product comparison application 123 to verify that the image is appropriate and/or relevant. For example, relevancy may be verified by employing a visual algorithm to match portions of an image provided by a manufacturer to portions of an image uploaded by a user.

By selecting a product image 222, the user may change the product image 222 displayed in the grid 145 corresponding to a product. Additionally, a user may initiate an upload of a new photo via button 266. In various embodiments, the photo may be added to catalog data 133 (FIG. 1) and/or further used by product comparison application 123 to offer a vast selection of images of a product. Further, the selection of an image may be used by product comparison application 123 to determine whether an image is an accurate portrayal of the corresponding product.

Figure 2E:
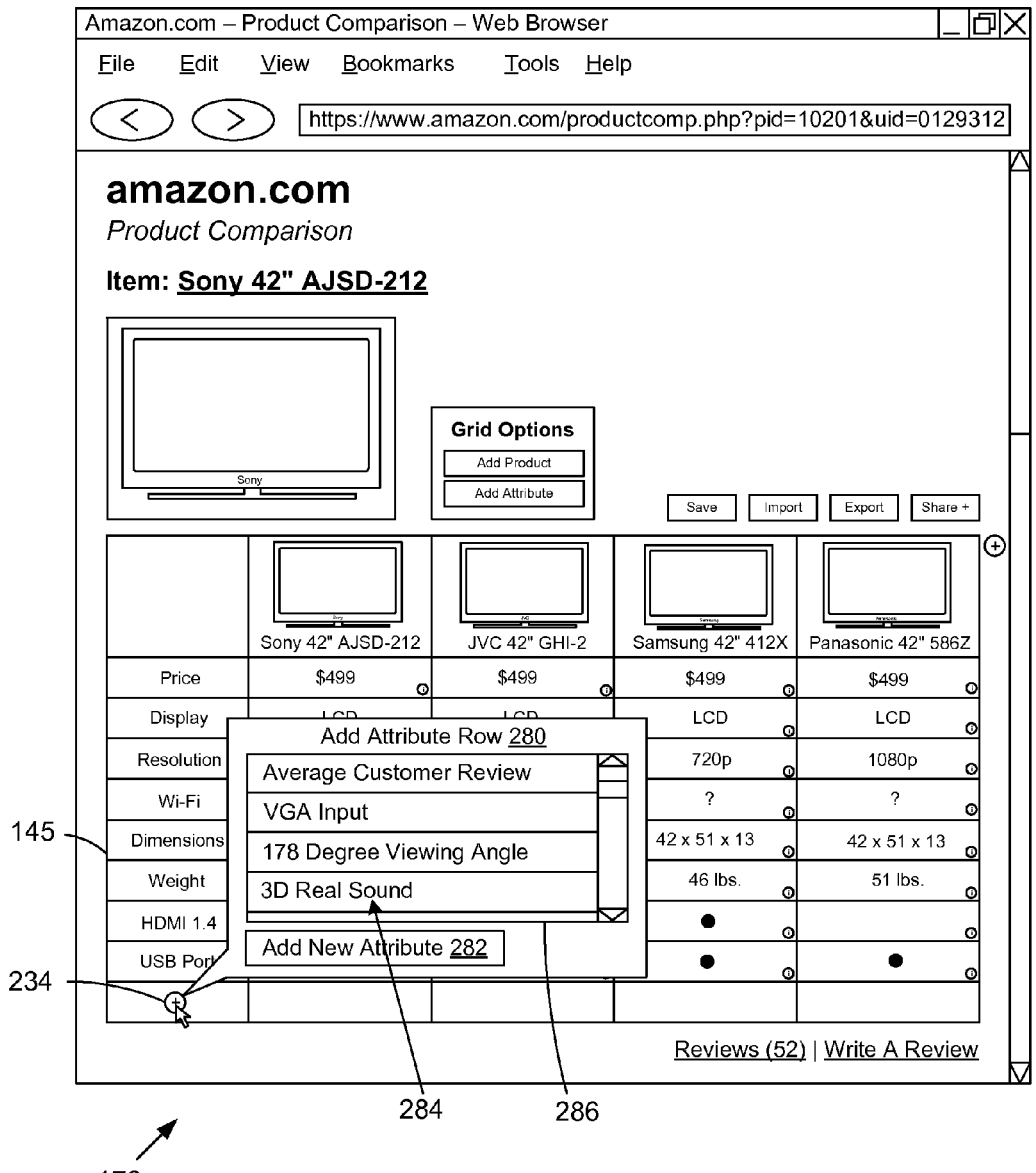

Turning now to FIG. 2E, shown is an example of a user interface 172 (FIG. 1), denoted herein as user interface 172e, in the browser 169 (FIG. 1) executed in the client 106 (FIG. 1) in the networked environment 100 (FIG. 1) according to various embodiments. Specifically, the rendered user interface 172d depicts a network page that corresponds to a product comparison grid 145 generated by product comparison application 123 (FIG. 1). Alternatively, the user interface 172e may be rendered on a client 106 by a dedicated application.

In this non-limiting example, the product comparison application 123 facilitates the addition of attributes to the grid 145. When a user engages icon 234, an add attribute dialog 280 may by shown to the user. The product comparison application 123 may determine a list of attributes 286 associated with one or more of the products listed. The determined list of attributes 286 may be shown by the user as suggestions. For example, the user may select attribute 284 to add as a row to the grid 145. Product comparison application 123 may automatically generate content for each cell corresponding to each product present in the grid 145.

In another embodiment, the add attribute dialog 280 may have a search field employing "auto-complete" functionality. For example, as a user types an attribute in the search field, a word or list of words may suggest attributes to the user based on what the user has typed. If a product attribute desired by a user is not shown in the list, the product comparison application 123 may permit the user to add a new attribute via button 282. The added attribute may be added to catalog data 133 (FIG. 1) and/or further used in suggesting relevant attributes to users.

Figure 2F:
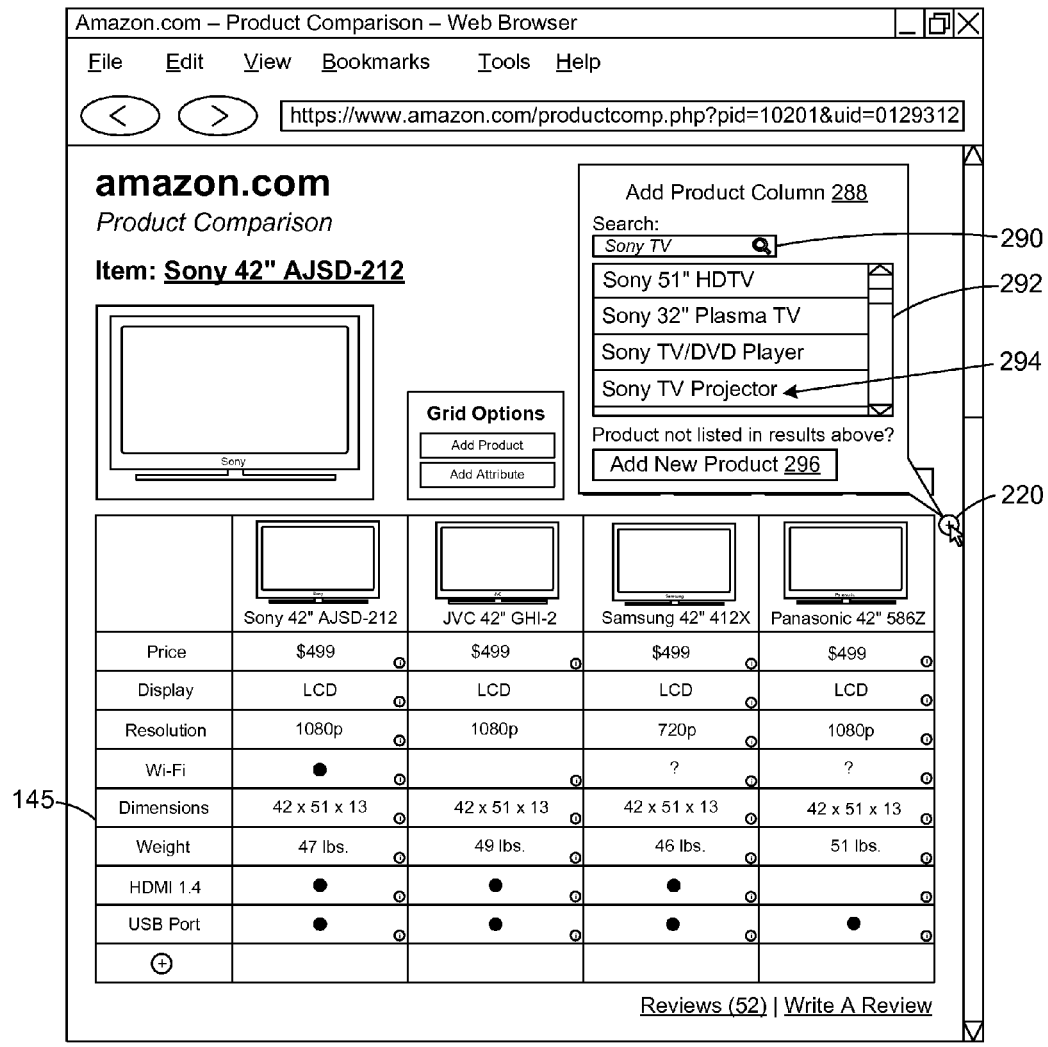

Turning now to FIG. 2F, shown is an example of a user interface 172 (FIG. 1), denoted herein as user interface 172f, in the browser 169 (FIG. 1) executed in the client 106 (FIG. 1) in the networked environment 100 (FIG. 1) according to various embodiments. Specifically, the rendered user interface 172f depicts a network page or dedicated application that corresponds to a product comparison grid 145 generated by product comparison application 123 (FIG. 1). Alternatively, the user interface 172f may be rendered on a client 106 by a dedicated application.

In this non-limiting example, the product comparison application 123 facilitates the adding of additional products to the grid 145. When a user engages icon 220, an add product dialog 288 may by shown to the user. The product comparison application 123 may determine products associated with one or more of the products listed. The determined products list 292 may be shown by the user as suggestions. In one embodiment, the products list 292 may be determined based at least in part on relevancy of the products currently listed in the grid 145. In another embodiment, the list of products may be determined based at least in part on the user's history in the electronic marketplace 130 (FIG. 1) (e.g., previously viewed products and/or previously purchased products). If a product attribute desired by a user is not shown in the list, the product comparison application 123 may facilitate the user to search for products via search field 290. In it understood that the search results may appear in products list 292 or elsewhere. For example, if a user were to input "Sony TV" in search field 290, search results in the form a list of products may appear in products list 292. The user may select one or more of the products 294 in the list to add to the grid 145. In this non-limiting example, the product may be added as another column. The product comparison application 123 may automatically generate content for each cell corresponding to each attribute present in the grid 145. If a search using search field 290 does not yield a desired product, a user may add a new product to the grid via button 296. Further, the added product may also be added to catalog data 133 (FIG. 1), used as a future product suggestion, and/or displayed as a search result.

Figure 3:
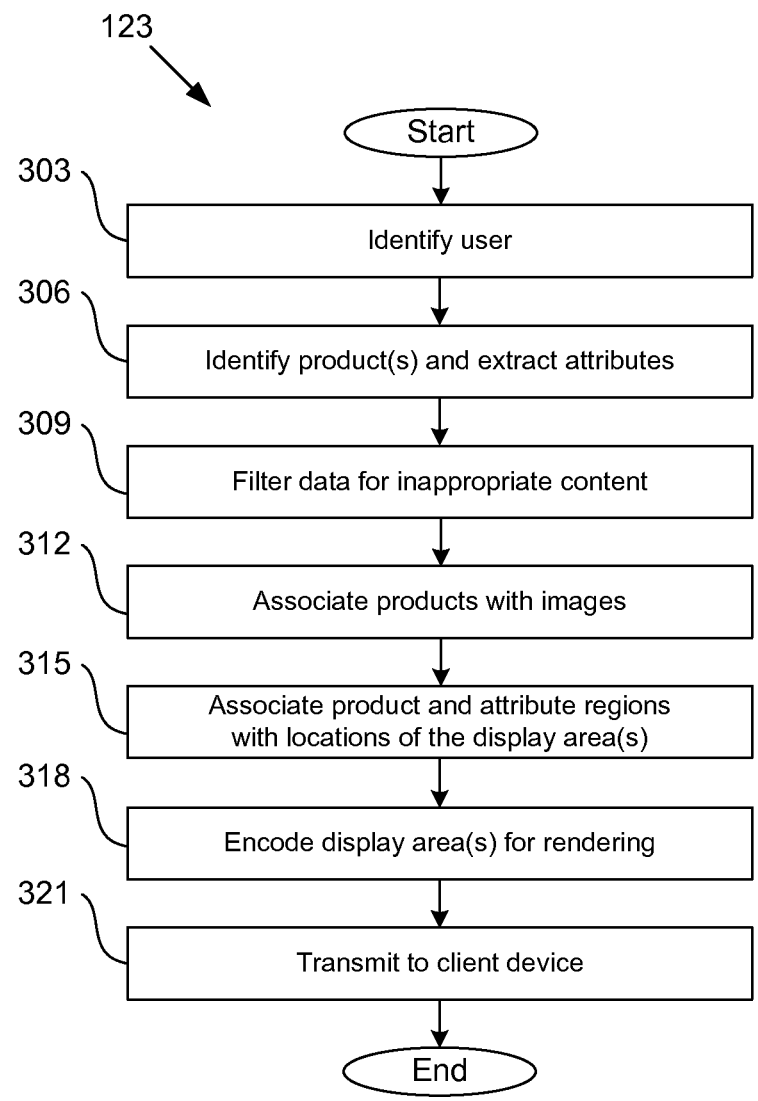
FIG. 3 is a flowchart illustrating one example of functionality implemented as portions of the product comparison application 123 executed in a computing device in the networked environment of FIG. 1 according to various embodiments of the present disclosure.

Referring next to FIG. 3, shown is a flowchart that provides one example of the operation of a portion of the product comparison application 123 according to various embodiments. It is understood that the flowchart of FIG. 3 provides merely an example of the many different types of functional arrangements that may be employed to implement the operation of the portion of the product comparison application 123 as described herein. As an alternative, the flowchart of FIG. 3 may be viewed as depicting an example of steps of a method implemented in the computing device 103 (FIG. 1) according to one or more embodiments.

Specifically, FIG. 3 depicts the generation of a grid 145 (FIG. 1) by the product comparison application 123. Generating a grid 145 may require identifying products, product attributes, and attribute data to populate the grid 145. Moreover, the attribute data may be filtered to ensure that all data presented is relevant and appropriate.

Beginning with box 303, a user of the product comparison application 123 is identified. Identifying the user may be beneficial in suggesting products based on the user's history and/or determining whether the user has any previously saved product comparison grids. Next, in box 306, products and attributes products are identified. The products and attributes may be identified based at least in part on the user, later discussed with respect to FIG. 4. In box 309, the data is filtered. For example, the data may be filtered if it contains inappropriate content such as offensive language, improper grammar, extraneous or irrelevant information, incorrect information, and/or any other inappropriate content.

Moving on to box 312, images are associated with the product. For example, an image associated with a product may be shown to a user in the grid 145 as depicted, for example, by image 222 (FIG. 2D). Alternatively, a plurality of images associated with a product may be shown to a user via dialog 268 (FIG. 2D). In box 315, products and attributes are associated with locations on the display areas. In the non-limiting example shown in FIGS. 2A-F, products may be assigned columns while attributes are assigned rows or vice versa. In box 318, the display areas are encoded by rendering the display areas. The products, attributes, and attribute data may be rendered to resemble, for example, a grid 145. Finally, in box 321, the encoded display areas are transmitted to a client device.

Figure 4:
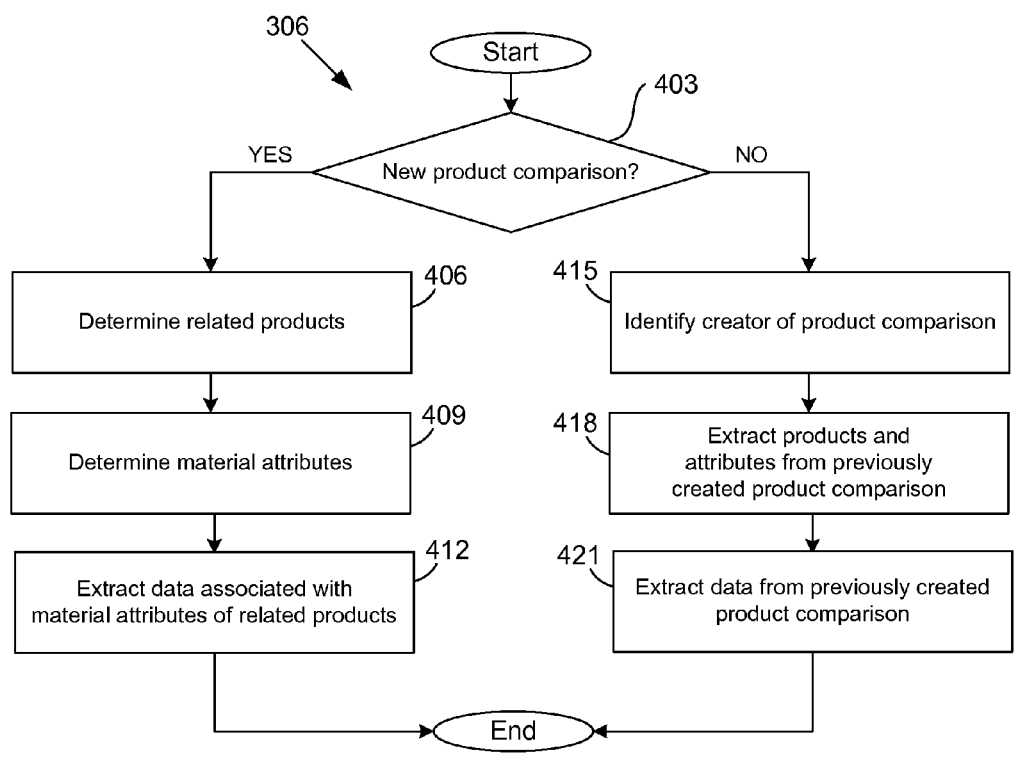
FIG. 4 is a flowchart illustrating one example of functionality implemented as portions of the product comparison application 123 executed in a computing device in the networked environment of FIG. 1 according to various embodiments of the present disclosure.

Referring next to FIG. 4, shown is a flowchart that provides one example of the operation of a portion of box 306 (FIG. 3) according to various embodiments. It is understood that the flowchart of FIG. 4 provides merely an example of the many different types of functional arrangements that may be employed to implement the operation of the portion of box 306 as described herein. As an alternative, the flowchart of FIG. 4 may be viewed as depicting an example of steps of a method implemented in the computing device 103 (FIG. 1) according to one or more embodiments.

Specifically, FIG. 4 depicts the operation of identifying and extracting products, product attributes, and attribute data by product comparison application 123 (FIG. 1). Determining which items to extract from a data store 112 (FIG. 1) and/or any other source of data may require identifying whether a grid 145 (FIG. 1) has been previously created by the user. If so, the previously determined products, product attributes, and attribute data may be used to populate the grid. If not, related products, product attributes, and attribute data may be used to populate the grid 145 as suggestions to the user.

Beginning with box 403, it is determined whether a new product comparison is being created. For example, a user may have requested product comparison application 123 to create a new grid 145. Alternatively, a user may have saved a grid 145 previously created in product comparison application 123. Alternatively, a user may be requesting a product comparison previously created by another user.

If it is determined in box 403 that the user desires to start a new product comparison, related products may be determined to pre-populate, for example, the grid 145 with related products in box 406. In one embodiment, related products may be determined, for example, by looking at the products the user has recently viewed in electronic marketplace 130 (FIG. 1) which may be stored in user data 136 (FIG. 1). Related products may also be determined by finding products similar to those recently purchased by the user. Alternatively, if the user was directed to the product comparison application 123 via a hyperlink on a product information page, the related products may include the product on the information page along with a number of other related products.

In another embodiment, related products may be determined by a product category stored in catalog data 133 (FIG. 1). For example, a Sony 42" television would fall under the "television" category. Accordingly, other televisions may be suggested to the user using the "television" category. In another embodiment, related products may be products bought by the user in the same transaction as another transaction. For example, it may be common for users to buy a television and a video game console in the same transaction. The video game console may be suggested to a user comparing televisions. In another embodiment, similarities of product attributes may be used to determine related products. For example, if a television has 1080p resolution, a video game compatible with 1080p resolution may be suggested to the user as a related product.

Next, in box 409, the product comparison application 123 determines material attributes. For example, attributes associated with the resolution or size of a television may be material in a product comparison. Materiality of an attribute may be calculated based at least in part on previous customer buying patterns and/or behavior determined based on product listings themselves. In box 412, the data associated with material attributes of related products is extracted from catalog data 133 and/or any other source of attribute data.

Alternatively, if it is determined that a new product comparison is not being created in product comparison application 123, the creator of the product comparison grid 145 will be identified in box 415. This may be necessary to identify a particular previously created product comparison grid 145. Next, in box 418, the products and attributes from the previously created product comparison will be identified in box 418. In box 421, the data associated with the attributes of the previously created product comparison may be extracted from user data 136, crowd data 139, catalog data 133, and/or any other source of attribute data. It is understood that attribute data previously saved by the user may be conflicting with current catalog data 133. The conflict may be presented to the user. For example, if the price of a television changed from $500 to $400, the previously saved grid 145 may visually highlight the previously saved $500 attribute data. If the user engages the highlighted price, a dialog may notify the user that the price has changed and also may initiate the change of the attribute data to the new price.

Figure 5:
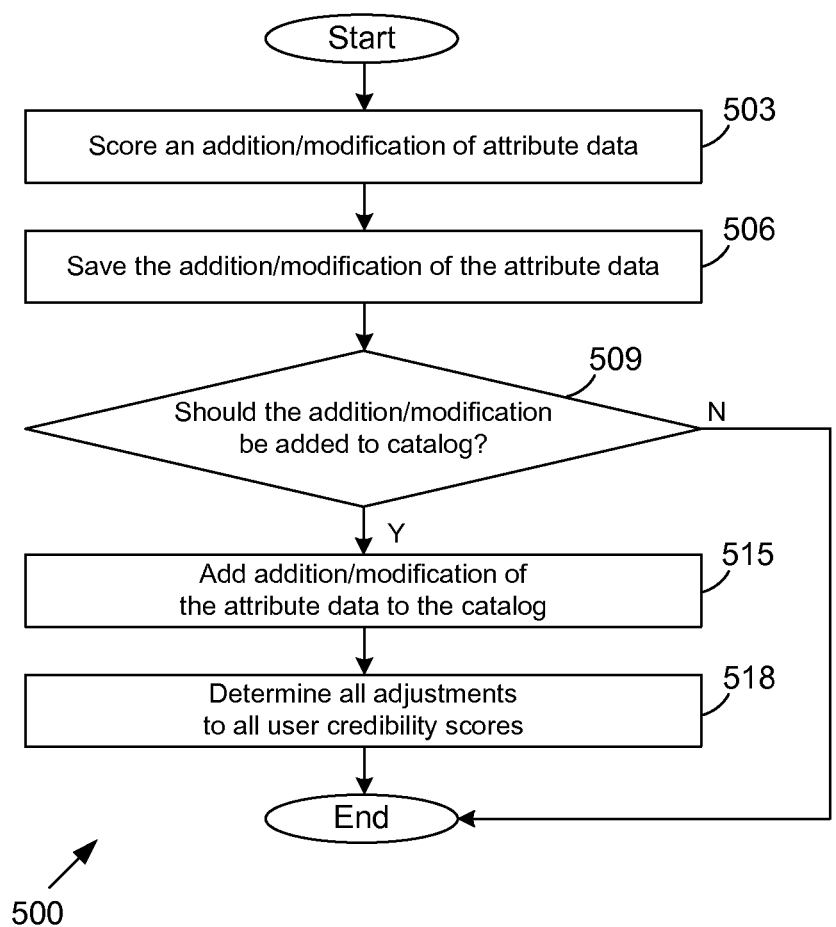
FIG. 5 is a flowchart illustrating one example of further functionality of the product comparison application 123 executed in a computing device in the networked environment of FIG. 1 according to various embodiments of the present disclosure.

Moving on to FIG. 5, shown is a flowchart 500 that provides one example of facilitating the addition or modification of attribute data associated with an item in the catalog data 133 (FIG. 1) according to various embodiments. It is understood that the flowchart 500 of FIG. 5 provides merely an example of the many different types of functional arrangements that may be employed to facilitate the addition of an attribute data as described herein. As an alternative, the flowchart 500 of FIG. 5 may be viewed as depicting an example of steps of a method implemented in the computing device 103 (FIG. 1) according to one or more embodiments.

As described above with reference to FIGS. 2A-F, it is understood that the user may add and/or modify an attribute, attribute data, and/or product data to the grid 145. For purposes of convenience, FIG. 5 is shown as adding and/or modifying attribute data. It is understood that the addition and/or modification may also be applied to adding and/or modifying an attribute and/or a product.

Beginning with box 503, the addition or modification of attribute data is assigned a score. The score may be assigned to the addition or modification of the attribute to assist the product comparison application 123 (FIG. 1) in determining which data to present to other users. In the example discussed above, the weight of a television may be provided by 100,000 users as 24.98 pounds. This attribute data may be given a higher score than a weight of the same television submitted by 15 users as 25 pounds. If the number of occurrences of the television weight as 25 pounds increases to surpass an occurrence threshold of 24.98 pounds, the product comparison application 123 may make the determination that a higher score is to be assigned to the former. Alternatively, the data may have been obtained from a very reliable source (e.g., the manufacturer of the product). The product comparison application 123 may give certain data a higher score while determining which data to display to a user. Although the addition or modification made by the user may be given a lower score than alternative data, the user may still choose to display the attribute data the user provided, rather than attribute data with a higher score.

Moving on to box 506, the addition or modification of the attribute data is saved. For example, the attribute data may be saved as crowd data 139 (FIG. 1). Next, in box 509, it is determined whether the addition or modification should be added to catalog data 133 (FIG. 1). If the score determined in box 503 meets a threshold ensuring reliability of the data, the added or modified attribute data may be associated with a product and saved in, for example, catalog data 133. If the threshold is not met, the modified attribute data may reside in crowd data 139 to be used in the determination of reliability of future modifications. It is understood that over time, as users make modifications, the reliability of the data may be re-determined in context of prior modifications. Each new modification will have a new score reflecting the reliability of that modification. For example, the next time a person adds or modifies attribute data, the product comparison application 123 may re-check the modification to determine whether it meets the threshold. Aggregate scores based on a combination of individual scores may determine if modifications are to be used and/or stored in the catalog.

In box 515, if the aggregate score of the respective addition or modification is determined to meet the required score threshold, the addition or modification will be associated with the product and added to, for example, catalog data 133. By constantly determining whether additions and/or modification meet the required threshold, the product comparison application 123 permits a general enrichment of the catalog data 133. Finally, in box 518, adjustments will be made to user credibility scores. For example, if a user submits data that was deemed correct, the user's credibility score may be incremented to give that user a higher credibility score. If a user submits data that was not deemed correct, the user's credibility score may be decremented to give that user a lower credibility score.

Figure 6:
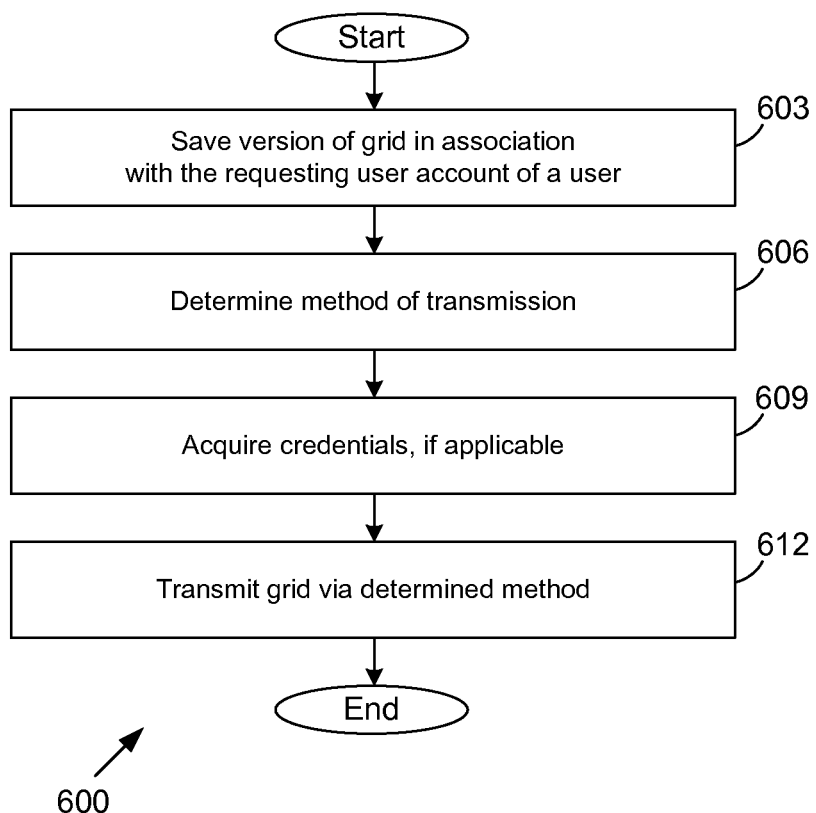
FIG. 6 is a flowchart illustrating one example of further functionality of the product comparison application 123 executed in a computing device in the networked environment of FIG. 1 according to various embodiments of the present disclosure.

Moving on to FIG. 6, shown is a flowchart 600 that provides one example of facilitating the transmission of a version of a grid 145 (FIG. 1) according to various embodiments. It is understood that the flowchart 600 of FIG. 6 provides merely an example of the many different types of functional arrangements that may be employed to facilitate the addition of an attribute data as described herein. As an alternative, the flowchart 600 of FIG. 6 may be viewed as depicting an example of steps of a method implemented in the computing device 103 (FIG. 1) according to one or more embodiments.

As previously discussed with respect to FIG. 2C, the product comparison application 123 (FIG. 1) may facilitate the sharing of a grid 145. In box 603, the version of the grid 145 is saved in association with requesting user's account. Next, in box 606, a method of transmission is determined. For example, the grid 145 may be transmitted to other users through e-mail, instant messaging, or a short message service (SMS). As an alternative, a hyperlink to the grid 145 may be posted on a social networking site such as Twitter, Facebook, Pinterest, and/or any other social networking site. As another alternative, the grid 145 may be transmitted to electronic marketplaces 130 (FIG. 1) as a buying guide as discussed above with respect to FIG. 2C.

In box 609, credentials may be required to transmit the grid 145 through e-mail, SMS, instant messaging, and/or social networking. For example, a user may be required to provide a user name and password associated with a social networking account before being permitted to post a hyperlink to the grid 145. Alternatively, the product comparison application 123 may have the capability of sending e-mails, not requiring the user to provide any credentials. Finally, in box 612, the grid 145 is transmitted via the previously determined method of transmission.

Figure 7:
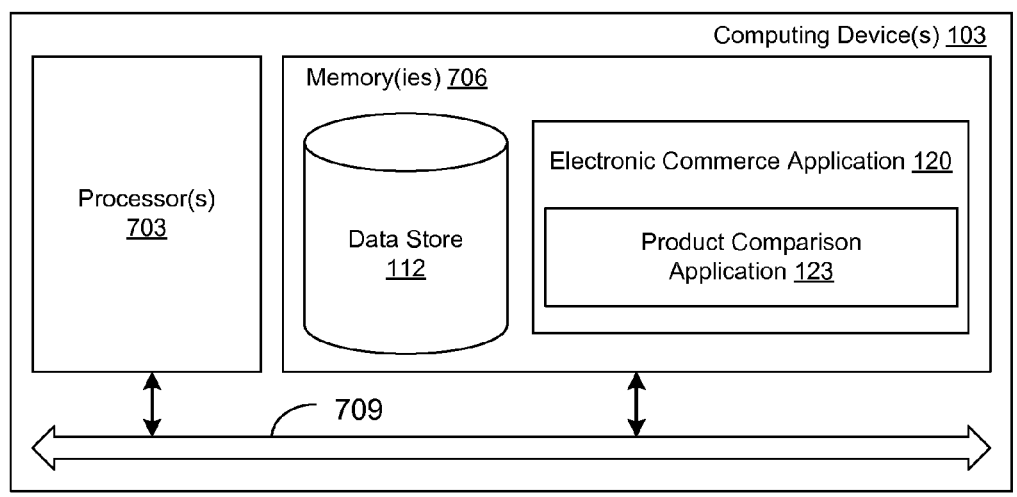
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are an electronic commerce application 120, a product comparison application 123, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce application 120, the product comparison application 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 5, 5, and 6 show the functionality and operation of an implementation of portions of the product comparison application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3, 5, 5, and 6 show a specific order of execution, it is understood that the order of execution may differ from that which is depicted. For example, the order of execution of two or more blocks may be scrambled relative to the order shown. Also, two or more blocks shown in succession in FIGS. 3, 5, 5, and 6 may be executed concurrently or with partial concurrence. Further, in some embodiments, one or more of the blocks shown in FIGS. 3, 5, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including electronic commerce application 120 and product comparison application 123, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an application executable in a computing device, the application comprising code that:
   identifies a plurality of products in a catalog stored in a data store for inclusion in a comparison grid, the comparison grid comprising a component of a user interface;
   encodes for display a plurality of instances of the comparison grid, each of the instances of the comparison grid listing a plurality of attributes of the products, wherein each of the instances of the comparison grid is sent to a respective one of a plurality of client devices;
   encodes at least one user interface component in the user interface that, when selected in the user interface, causes a subsequent user interface to be rendered comprising a review associated with at least one of the products;
   stores a plurality of modifications of attribute data associated with at least one of the attributes of the products made by a respective one of a plurality of users of the client devices;
   determines a score expressing a degree of accuracy of each of the modifications, wherein the score is calculated based at least in part on a user credibility score associated with the respective one of the users who created a respective one of the modifications, wherein the user credibility score is calculated as a function of an accuracy of a plurality of prior modifications made by the respective one of the users, wherein the user credibility score is improved for the respective one of the users in response to at least one of the prior modifications made by the respective one of the users being used as the attribute data for at least one of the products in at least one other comparison grid;
   applies at least one of the modifications to the at least one of the attributes if an aggregate score for the at least one of the modifications exceeds a predefined threshold, wherein the aggregate score is calculated from each of the scores;
   populates the comparison grid with the products, the attributes, attribute data, and the at least one of the modifications; and
   stores at least one of the instances of the comparison grid in association with an account of the respective one of the users in the data store.

2. The non-transitory computer-readable medium of claim 1, wherein the application further comprises code that adjusts the user credibility score of a respective one of the users depending on whether the user proposes the modification that is applied to the one of the attributes of the products in the catalog.

3. The non-transitory computer-readable medium of claim 1, wherein the application further comprises code that facilitates a transmission of the at least one instance of the comparison grid to the plurality of users.

4. The non-transitory computer-readable medium of claim 1, wherein the at least one user interface component further comprises a hyperlink.

5. A system, comprising:
   at least one computing device; and
   a catalog stored in a data store accessible to the at least one computing device, the catalog including a listing of a plurality of products; and an application executable in the at least one computing device, the application comprising logic that:
  a plurality of instances of a comparison grid for display in a user interface, each of the instances of the comparison grid listing a plurality of attributes of selected ones of the products, wherein each of the instances of the comparison grid is sent to a respective one of a plurality of client devices;
  encodes at least one user interface component in the user interface that, when selected in the user interface, causes a modification of at least one of the attributes or attribute data encoded in the comparison grid;
  stores in the data store a plurality of modifications of the attribute data associated with the attributes of one of the products made by a respective one of a plurality of users of the client devices;
  determines a score expressing a degree of accuracy of the modifications of the attribute data, the score being calculated based at least in part on a user credibility score associated with the respective one of the users who created a respective one of the modifications, the user credibility score being calculated as a function of at least one prior modification made by the respective one of the users in a previously generated comparison grid; and
  determines whether at least one of the modifications is to be applied to one of the attributes of the one of the products in the catalog based at least in part on the score.

6. The system of claim 5, wherein the application further comprises logic that facilitates an addition of one of the products from the catalog to at least one of the instances of the comparison grid.

7. The system of claim 5, wherein the application further comprises logic that stores in the data store at least one of the instances of the comparison grid in association with a user account.

8. The system of claim 7, wherein the application further comprises logic that facilitates a transmission of the at least one of the instances of the comparison grid generated by a first one of the users to a second one of the users.

9. The system of claim 5, wherein the application further comprises logic that applies the at least one of the modifications to a corresponding one of the attributes if an aggregate score is greater than a predefined threshold, wherein the aggregate score is calculated from the scores determined for each of the modifications.

10. The system of claim 5, wherein the user credibility score of the respective one of the users is increased each time the user submits a proposed modification that is applied to the one of the attributes.

11. The system of claim 5, wherein the user credibility score of a respective one of the users is decreased each time the user submits a proposed modification that is not applied to the one of the attributes.

12. The system of claim 5, wherein the at least one user interface component further comprises a user interface button.

13. A computer-implemented method, comprising:
  identifying, by at least one computing device comprising at least one hardware processor, a plurality of products in a catalog stored in a data store;
  encoding, by the at least one computing device, a plurality of instances of a product description for display, each of the instances of the product description listing an attribute of one of the products, wherein each of the instances of the product description is sent to at least one of a plurality of client devices;
  encoding, by the at least one computing device, at least one user interface component in the user interface that, when selected in the user interface, causes at least one of the attributes or attribute data to be modified;
  storing, by the at least one computing device, a plurality of modifications of the attribute data associated with the attribute made by a respective one of a plurality of users of the client devices;
  determining, by the at least one computing device, a score expressing a degree of accuracy of each of the modifications of the attribute data, the score being calculated based at least in part on a user credibility score associated with the respective one of the users who created a respective one of the modifications; and
  determining, by the at least one computing device, whether at least one of the modifications is to be applied to the attribute of the one of the products in the catalog based at least in part on the score.

14. The computer-implemented method of claim 13, further comprising applying, by the at least one computing device, the at least one of the modifications to the attribute if an aggregate score is greater than a predefined threshold, wherein the aggregate score is calculated from each of the scores.

15. The computer-implemented method of claim 13, wherein the user credibility score is calculated as a function of a plurality of prior modifications by the respective one of the users.

16. The computer-implemented method of claim 15, wherein the user credibility score of the respective one of the users is increased when the respective one of the users proposes the at least one of the modifications that is applied to the attribute.

17. The computer-implemented method of claim 15, wherein the user credibility score of the respective one of the users is decreased when the respective one of the users proposes the at least one of the modifications that is not applied to the attribute.

18. The computer-implemented method of claim 13, wherein the score is calculated based at least in part on an estimated accuracy of the at least one of the modifications.

19. The computer-implemented method of claim 18, wherein the estimated accuracy of the at least one of the modifications is based at least in part on a comparison of the at least one of the modifications with data provided by a manufacturer.

20. The method of claim 13, wherein the at least one user interface component further comprises a user interface button.

21. The method of claim 13, wherein the at least one user interface component further comprises a hyperlink.

* * * * *

UNITED STATES PATENT AND TRADEMARK OFFICE
CERTIFICATE OF CORRECTION

PATENT NO. : 9,152,990 B1  
APPLICATION NO. : 13/494113  
DATED : October 6, 2015  
INVENTOR(S) : Kanter et al.

Page 1 of 1

It is certified that error appears in the above-identified patent and that said Letters Patent is hereby corrected as shown below:

In the claims

Column 15, Line 3, claim 5: change "a plurality" to --encodes a plurality--

Signed and Sealed this
Seventh Day of June, 2016

Michelle K. Lee
*Director of the United States Patent and Trademark Office*